W. G. WILMS.
SAW TOOTH SHAPER.
APPLICATION FILED MAY 11, 1910.
987,935.
Patented Mar. 28, 1911.
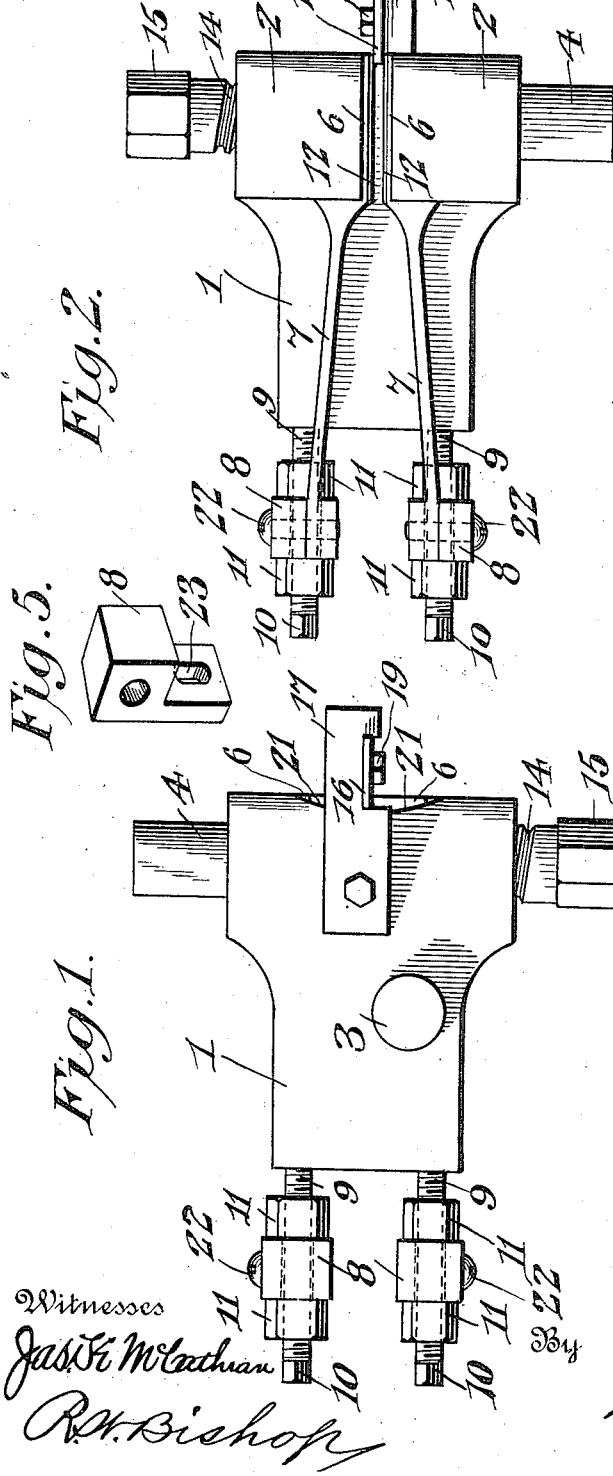
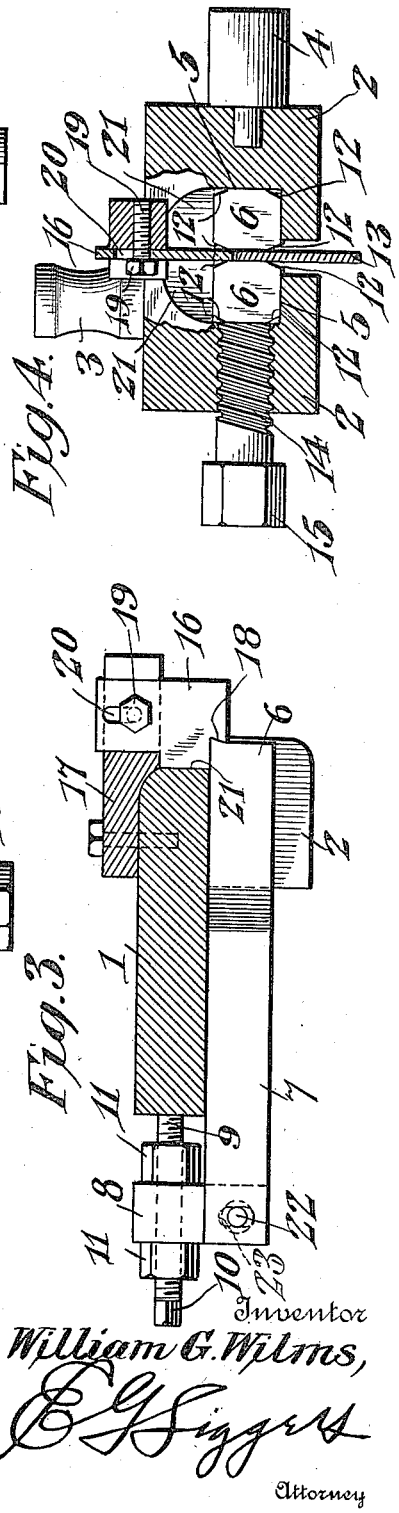
Witnesses
Jas. F. McCathran
R. W. Bishop
Inventor
William G. Wilms,
By E. G. Siggers
Attorney

UNITED STATES PATENT OFFICE.

WILLIAM G. WILMS, OF HIGHLAND, CALIFORNIA.

SAW-TOOTH SHAPER.

987,935.  Specification of Letters Patent.  Patented Mar. 28, 1911.

Application filed May 11, 1910. Serial No. 560,701.

*To all whom it may concern:*

Be it known that I, WILLIAM G. WILMS, a citizen of the United States, residing at Highland, in the county of San Bernardino and State of California, have invented a new and useful Saw-Tooth Shaper, of which the following is a specification.

This invention relates to devices for shaping swaged saw teeth, and one object of the invention is to provide a firm support for the dies, whereby they will be prevented from slipping forward on the saw teeth when the device is in use.

A further object of the invention is to provide means whereby the stop or gage may be readily adjusted so that the saw tooth will be always in its proper position relative to the dies for the shaping operation.

A further object of the invention is to provide a device for the purpose stated which may be held firmly to the saw teeth and easily operated, and which will be capable of prolonged use and may be manufactured at a comparatively slight cost.

All these objects, and such other incidental objects as will hereinafter appear, are attained in the use of the device illustrated in the accompanying drawings, and the invention consists in certain novel features thereof which will be hereinafter first fully described and then more particularly pointed out in the appended claims.

In the drawings,—Figure 1 is a plan view of a tool embodying my present improvements. Fig. 2 is a bottom plan view of the same. Fig. 3 is a central longitudinal section thereof. Fig. 4 is a sectional end elevation. Fig. 5 is a detail view of a die carrier.

The body 1 consists of a substantially rectangular plate provided at one end on its under side with depending blocks or die supports 2 and having on its upper side a knob or handle 3 which may be grasped by the hand of the operator, together with a similar knob or handle 4 on one side to hold the device in position upon the teeth of the saw being treated. The depending blocks or die supports 2 are spaced apart at the center of the device and are provided in their opposed faces with grooves or seats 5 in which the dies 6 rest, the said dies being provided with spring arms 7 which extend beyond the opposite edge of the body 1 and are secured to carriers 8 which fit around the supporting screws 9, secured in and extending from the body 1 and provided at their outer extremities with angular portions 10, whereby they may be easily engaged by a wrench or similar tool to be inserted in or withdrawn from the body. The carriers 8 fit around the screws 9 at their upper ends but have smooth bores so that they do not mesh with the threads of the screws but are movable freely on the screws and below said bores they are cut away, as best shown in Fig. 5, to accommodate the ends of the spring arms.

In order to secure the carriers at the desired points upon the screws, I employ lock nuts 11 which mesh with the threads of the screws at opposite sides of the carriers and are adapted to bind against the carriers so as to firmly secure the same in their adjusted positions, as will be readily understood.

The dies 6 have substantially flat faces or sides and are provided at their extreme outer ends with slightly beveled portions 12 whereby the faces of the dies may fit squarely against the opposite sides of the saw tooth and at the same time fit close to the point or edge of the tooth without changing the shape of the said point or edge. The spring arms 7 normally hold the dies apart, and in order to force them toward each other against the opposite sides of the saw tooth, which is indicated at 13 in Fig. 4, I employ a screw 14 mounted transversely in the body and extending through the die support 2 to bear against the side of one of the dies, the screw being provided with a suitable operating head 15 which may be readily grasped by the fingers of one hand, as will be readily understood. When this screw is operated, the die against which it bears will be forced inward, in opposition to the spring arm carrying the same, and will thereby be forced against the side of the tooth so that the tooth will be carried against the coacting die and thereby pinched against the said die so that the sides of the various saw teeth will be brought to an exactly equal width or gage and left perfectly straight and uniform along the sides of the points of the teeth.

When the upper faces of the dies have been worn to such an extent as to be no longer accurate, the dies can be reversed so as to bring the lower faces to the upper working position. When two opposites have been thus utilized, the dies may be interchanged so that the faces which were formerly at the outer sides of the dies may be brought into the working position. The dies may, of course, be inverted after being interchanged so that each die will furnish four working faces and the durability of the tool, therefore, enhanced. The dies will be secured rigidly in position by means of the nuts 11 bearing against opposite sides of the carriers 8 so that they cannot slip forward on the saw tooth when the working pressure is applied thereto.

The spring arms are secured to the carriers by screws 22 passing through slots 23 in the carriers to engage the spring arms. The slots 23 permit such adjustment as may be necessary to compensate for slight differences in the size of the two spring arms so that they will perform their functions properly after being interchanged.

In order to insure the fitting of the tool to the saw in the proper position for the exact shaping of the tooth, I provide a stop consisting of a thin plate 16 which is secured to an arm 17 projecting from the upper side of the body, and this plate 16 is provided in its lower edge with a notch 18 in which the point of the saw tooth is engaged. The stop is secured to the arm 17 by means of a bolt 19 inserted through a slot 20 whereby it may be adjusted to compensate for wear and to insure the holding of the tooth in such position that it will come immediately below the upper surface of the die, and in order to accommodate the said stop, a recess 21 is formed in the end of the body, as shown.

The advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what I claim as new, and desire to secure by Letters Patent, is:—

1. A saw tooth shaper comprising a body member, a pair of dies, each elastically and independently mounted on the body member, and an adjusting member carried by the body member in operative relation to one of the dies for moving the latter toward the other die at will.

2. A saw tooth shaper comprising a body member provided with die receiving seats, dies normally lodged in the seats, spring arms each carrying one of the dies, independent carriers for the spring arms, and means for causing a relative movement of the dies one toward the other.

3. A saw tooth shaper comprising a body member provided with die receiving seats, dies normally lodged in the seats, spring arms each carrying one of the dies, independent carriers for the spring arms, means for causing a relative movement of the dies one toward the other, and supports individual to the carriers and having adjusting means for said carriers.

4. A saw tooth shaper comprising a body member having die supporting seats therein, supporting screws projecting from the body member at a point remote from the die supporting seats, carriers mounted on said screws to move loosely thereon, lock nuts on the screws adapted to secure the carriers at any desired point on the screws, separate spring arms each individual to a respective carrier and having a die at its free end adapted to a respective die seat in the body member, and means on the body member for causing the movement of one die toward the other against the action of its spring arm.

5. In a saw tooth shaper, a body member having die supporting seats therein at one end, supports projecting from the opposite end of the body member, separate spring arms each carried by and individual to a respective support and having a die at the free end resting in a corresponding seat in the body member, and an operating screw mounted on the body member and adapted to bear against one of the dies.

6. In a saw tooth shaper, a body member having separated handles projecting from different faces of the body member, dies carried by the body member, spring arms each having a respective die at one end and having a mounting individual thereto in the body member at the other end, means for operating the dies, and a stop member on the body member extending between the dies.

7. In a saw tooth shaper, a body member having die seats formed therein, die supports projecting from the body member at a point remote from the seats, die carriers adjustably mounted on said supports, and each provided with a slot at one side of its support, dies adapted to the seats in the body member, spring arms one for each die and individually connected to a respective carrier at the slotted portion thereof, and means for causing the approach of one die toward the other to shape the saw teeth.

8. In a saw tooth shaper, the body having at one end on its underside die supports, which are spaced apart and provided in their opposed faces with grooves, dies placed in said grooves, spring arms, one for each die, projecting from said dies toward the rear end of the body, separate spaced screws projecting from the rear end of the body, carriers at the rear ends of the springs, said carriers being mounted on the screws, adjusting nuts mounted on the screws and engaging the carriers, and operating means for the dies.

9. In a saw tooth shaper, the body provided with spaced die supports having die seats on their opposed faces, interchangeable, reversible dies mounted on the die seats, spring arms each carrying a die, means for connecting the spring arms to the body at spaced points, said means permitting the individual adjustment and removal of the spring arm with its die, and means for operating the dies.

10. A saw tooth shaper provided with a single piece body member having grooves therein, dies in said grooves, spring arms each carrying a die as an integral part thereof and individually secured to the body member, and means for causing the approach of one die toward the other against the normal tendency of the respective spring arm.

11. A saw tooth shaper provided with a single piece body having at one end on its underside die supports which are spaced apart, two dies mounted in said die supports, two spring arms each carrying one of the dies, and individually secured to the body in rear of the dies and adjusting means carried by the body and operating directly against one of the dies for moving the same toward the other die.

In testimony, that I claim the foregoing as my own, I have hereto affixed my signature in the presence of two witnesses.

WILLIAM G. WILMS.

Witnesses:
 GEO. RODDICK,
 J. KUNZMANN.

Copies of this patent may be obtained for five cents each, by addressing the "Commissioner of Patents, Washington, D. C."